March 5, 1968 R. A. PENDLETON 3,371,835
WEB TRANSPORT WITH SKEW CONTROL
Filed Oct. 14, 1965 2 Sheets-Sheet 1

INVENTOR
ROBERT A. PENDLETON
BY Fred Jacob
ATTORNEY

March 5, 1968 R. A. PENDLETON 3,371,835

WEB TRANSPORT WITH SKEW CONTROL

Filed Oct. 14, 1965 2 Sheets-Sheet 2

INVENTOR
ROBERT A. PENDLETON

BY Fred Jacob
ATTORNEY

United States Patent Office 3,371,835

Patented Mar. 5, 1968

3,371,835

WEB TRANSPORT WITH SKEW CONTROL

Robert A. Pendleton, Dedham, Mass., assignor to Honeywell Inc., Minneapolis, Minn., a corporation of Delaware Filed Oct. 14, 1965, Ser. No. 495,900
11 Claims. (Cl. 226—50)

ABSTRACT OF THE DISCLOSURE

A mechanism for controlling web skew in a web transport wherein at least one capstan defines a curved path portion that is followed by the web. A pressure button bears resiliently against one web edge, making contact with an edge segment that is small relative to the curved path portion defined by the capstan. The action of the pressure button urges the opposite web edge into contact with a fixed guide surface, thus providing web skew control.

The present invention relates in general to new and improved web transports, in particular to transports wherein a web is selectively moved past an operating station and means are provided for inhibiting web skewing at the station.

The term "skewing," as employed herein, is intended to include rotational motion of the web in the plane thereof, transverse translational web motion in the web plane, as well as combinations of these motions. Such skewing may be caused by a relatively long, unsupported tape span, or by motion of the tape moving means in a direction transverse to the intended tape movement. It may also be occasioned by a tape of non-uniform width.

Skew inhibiting means are particularly important in magnetic tape transports wherein data is recorded at relatively high densities in a number of longitudinal tape channels, such channels being successively spaced from each other along the transverse dimension of the tape. The operating station in a magnetic tape transport may include a transducer in the form of at least one magnetic head having a separate pair of pole pieces aligned with each tape channel. The pole faces of each pair of pole pieces are spaced from each other to define a gap, corresponding gaps being aligned along said transverse tape dimension. The gap line of the magnetic head is positioned in close proximity to the magnetic tape in operation and is separated from the latter by an air film having a thickness of the order of a few microinches.

Under optimum operating conditions, the tape moves only in the direction of its longitudinal dimension. The tape channels thus remain aligned with their corresponding gaps. When skewing occurs, however, each tape channel has a transverse component of motion with respect to its corresponding gap, i.e., there is motion along the gap line. Where high recording densities are employed, even a slight amount of skewing may result in previously recorded data being incorrectly read out. Alternatively, such skewing may result in the recording of data which is difficult, if not impossible, to play back under normal conditions.

A representative magnetic tape transport that may be subject to skewing is illustrated in Patent No. 2,970,732 to R. B. Lawrence et al., which is assigned to the assignee of the present application. In some prior art equipment of this type, a pair of fixed tape guides is positioned on both sides of the gap in order to inhibit the aforesaid tape motion. Variations of the tape width generally dictate a spacing of the guides which still permits tape skewing, and hence such an arrangement has not proven to be satisfactory. A solution has been proposed which contemplates the use of a guide spool, wherein one flange is spring-loaded and movably urges the tape against an oppositely positioned fixed spool flange. Such a solution is generally expensive to implement since it requires that the existing tape path be modified. Specifically, in order for the skew inhibiting means to achieve the maximum effect, it must be located between the tape driving means and the gap line. Generally this requires the repositioning of the tape brake which is normally located at this position so that optimum braking action is no longer possible. Moreover, the presence of the guide spool modifies the tape path, i.e., it changes the direction of tape motion. In such a case an additional guide spool may be required in order to re-establish the desired direction of tape motion.

It is the primary object of the present invention to provide new and improved tape skew control means which are not subject to the foregoing disadvantages.

It is a further object of the present invention to provide tape skew inhibiting means which are readily positioned between the drive means and the gap line.

It is an additional object of the present invention to provide tape skew inhibiting means which flexibly guide the tape along an exactly repeatable path.

These and other objects of the present invention, together with the features and advantages thereof, will become apparent from the following detailed specification, when read in conjunction with the accompanying drawings in which.

Figure 1:
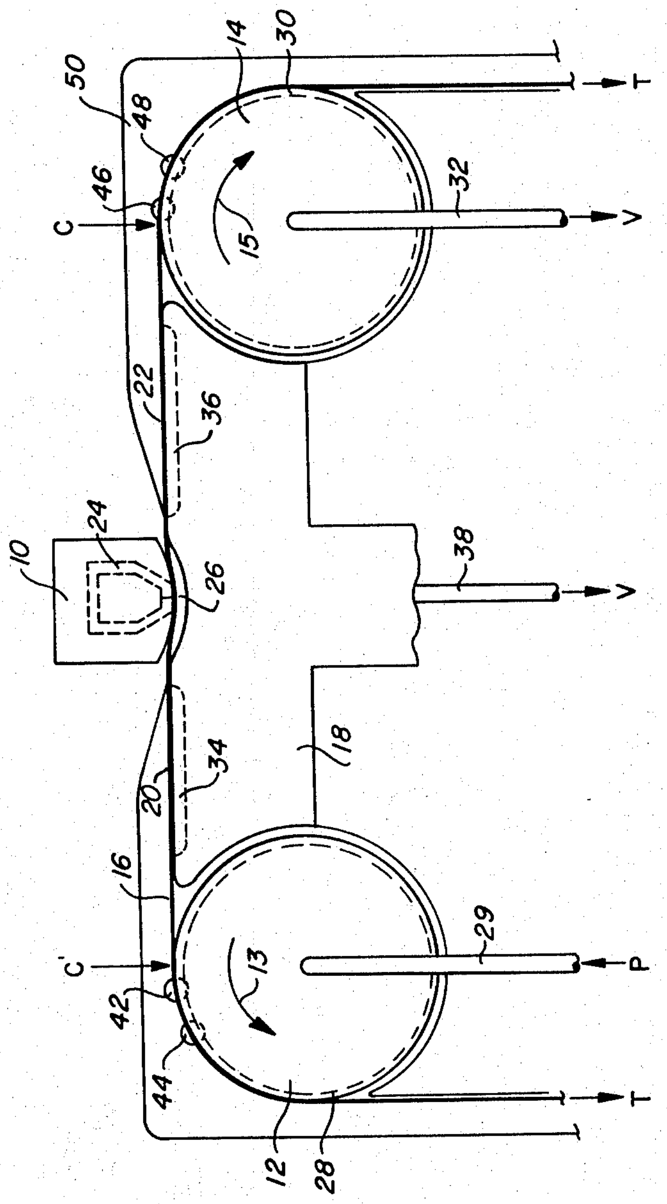
FIGURE 1 illustrates a preferred embodiment of the present invention.

With reference now to the drawings, FIGURE 1 shows a preferred embodiment of a magnetic tape transport wherein an operating station, in the form of a magnetic head 10, is positioned between a pair of mutually spaced drive capstans 12 and 14 respectively, which have parallel axes. The capstans 12 and 14 constantly rotate in opposite directions, as indicated by the arrows 13 and 15 respectively, and are adapted to drive a flexible magnetic tape 16 in a selected direction past the head 10.

Figure 2:
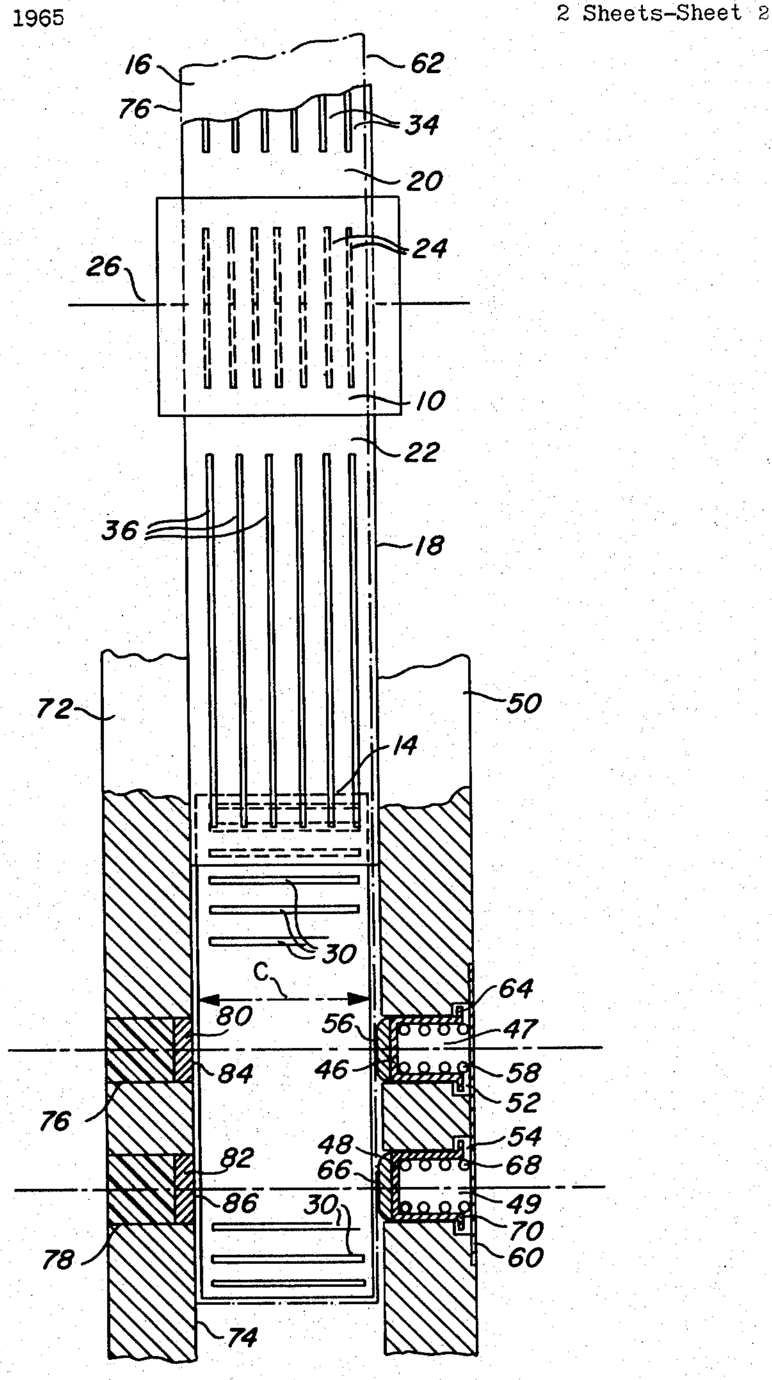
FIGURE 2 illustrates in partial top view the apparatus of FIGURE 1.

As best seen in FIGURE 2, the magnetic head 10 is somewhat narrower than the tape 16 which is here shown in phantom outline. The head 10 includes a plurality of magnetic cores 24, each consisting of a pair of pole pieces 24 whose pole faces define aligned gaps 26. FIGURE 2 illustrates approximately one-half of the apparatus of FIGURE 1 which is seen to be symmetrical with respect to the gap line 26. It will be understood that structure substantially identical to that shown in FIGURE 2 and located on the other side of the gap line 26, forms part of the preferred embodiment of the present invention.

The capstan 14 is seen to have a plurality of transverse surface grooves 30 positioned on its perimeter. Vacuum pressure may be selectively applied to the grooves 30 through a communicating conduit 32. Similarly, the capstan 12 has a plurality of transverse slots 28 disposed around its perimeter to which vacuum pressure may be applied through a communicating conduit 29.

A brake 18 includes a pair of surfaces 20 and 22 which are presented to the tape 16 and which are preferably wider than the tape. The brake surfaces 20 and 22 further contain longitudinal surface grooves 34 and 36 respectively. In a preferred embodiment of the invention, vacuum pressure V is constantly applied to these grooves through a communicating conduit 38. By the selective application of vacuum pressure V to the conduit 32, the tape 16 is caused to adhere to the rotating capstan 14 and is driven in the direction indicated by the arrow 15. In such a case, positive pressure P is applied to the conduit 29. The tape thus remains separated from the latter capstan by a constant film of air. Alternatively vacuum pressure V is applied to the conduit 29 and positive pressure P is applied to the conduit 32. In the latter case, the tape moves past the magnetic head 10 in the opposite direction.

The tape is maintained under tension, as indicated by the arrows designated T in FIGURE 1. Preferably, this is accomplished through the use of vacuum loop chambers which may be positioned to receive or pay out tape relative to the capstans 12 and 14. Inasmuch as the use of such loop chambers is beyond the scope of the present application, it will not be further discussed herein.

When moving in the direction of the arrow 15, the tape initially makes contact with the capstan 14 along a line C. In this mode of operation, the tape leaves engagement with the capstan 12 at line C'. When moving in the opposite direction, the lines C' and C define the final and initial tape engagement respectively, with the corresponding capstan. Each capstan imposes a curved path portion on the tape 16 during engagement with the latter. A pair of spaced pressure buttons 42 and 44 is located adjacent the curved path portion determined by the capstan 12. The pressure button 42 is seen to be disposed in close proximity to the line C'. Similarly, a pair of spaced pressure buttons 46 and 48 is located adjacent the curved tape path portion determined by the capstan 14. The button 46 is positioned in close proximity to the line C. Both pairs of pressure buttons are carried by a supporting structure 50 which extends alongside both capstans 12 and 14.

FIGURE 2 shows the pressure buttons 46 and 48, which are substantially identical, to be disposed in separate bores 47 and 49 respectively, of the supporting structure 50. The structure 50 is seen to abut a vertical surface of the brake 18, the latter serving as a positioning guide for the structure 50. The bores have sections of enlarged internal diameter 52 and 54 respectively, at their ends remote from the capstan 14. Each enlarged bore section is separated by an internal shoulder from the remainder of the bore. The pressure button 46 has a generally hollow cylindrical shape with a cap of wear-resistant material at one end terminating in a pressure surface 56. A compression spring 58 bears against a closure plate 60 which covers the remote end of the corresponding bore. The compression spring 58 is largely disposed in the hollow interior of the pressure button 46, so as to urge the pressure surface 56 of the latter against an edge 62 of the tape 16. An outwardly extending flange 64 of the pressure button 46 determines the limit of forward travel of the latter by abutting against the aforesaid internal shoulder of the bore 47.

In similar manner, the pressure button 48 terminates in a pressure surface 66 which is urged against the tape edge 62 by the action of a compression spring 68. An outwardly extending flange 70 of the pressure button 48 abuts the internal shoulder of the bore 49 to determine the limit of forward button travel.

FIGURE 2 shows a guide structure 72 which presents a planar guide surface to the opposite edge 76 of the tape 16. The guide structure is seen to abut the opposite vertical surface of the brake 18 which serves as a positioning guide. The guide surface 74 extends alongside both capstans 12 and 14, and is thus positioned adjacent both of the aforesaid curved portions of the tape path. The guide structure includes a pair of bores 76 and 78 which are coaxial with the bores 47 and 49 respectively. A pair of fixed buttons 80 and 82 is cemented into the bores 76 and 78 respectively by means of an epoxy resin or the like, at the bore ends facing the capstan 14. Wear-resistant contact surfaces 84 and 86 respectively, co-planar with the guide surface 74, are thus presented to the tape edge 76.

For the purpose of explaining the operation of the present invention, let it be assumed that the capstan 14 acts as the tape drive capstan, i.e. vacuum pressure is applied to the conduit 32, while positive pressure is applied to the conduit 29. As a result of the vacuum pressure applied through the slots 30, the tape 16 is sucked into contact with the capstan periphery and moves in the direction of the arrow 15. Although initial contact between the tape and the capstan 14 occurs at line C, the applied vacuum pressure is not immediately effective to cause the tape to adhere firmly to the capstan. The pressure buttons 46 and 48 are positioned in a region of the aforesaid curved tape path portion imposed by the capstan 14 wherein the vacuum pressure has not yet firmly taken hold of the tape. As a consequence, the pressure applied by the spring-loaded buttons 46 and 48 against the tape edge 62 is effective to urge the opposite tape edge 76 into contact with the guide surface 74. The contact surfaces 84 and 86 bear the main brunt of the pressure applied by the buttons 46 and 48 respectively and prevent damage, in the form of grooving, to the guide surface 74. The curvature of the tape path in this region adds the necessary element of strength to prevent the tape from collapsing, i.e. from folding under the pressure applied by the buttons 46 and 48.

It will be understood that the pressure buttons 42 and 44 similarly urge the tape against the guide surface 74 which extends opposite thereto. The tape is thus constantly referenced with respect to the planar guide surface 74 and the skewing of the tape with reference to the gap line 26 is inhibited. Irregularities of the tape edge 62, i.e. regions of non-linearity, will not produce skewing provided the tape edge 76 remains linear. If the tape edge 76 is non-linear, tape skewing will, of course, take place and the recording channels of the tape will display a corresponding non-linearity. However, by the use of the present invention such irregularities are not detrimental to reliable playback of the recorded data. This is due to the fact that the skewing which does take place during recording is precisely reproduced upon playback owing to the action of the pressure buttons.

From the foregoing disclosure, it will be apparent that the present invention provides an improved tape transport wherein tape skewing, due to both rotation of the tape in the plane thereof as well as to lateral tape shifting, is minimized. Where skewing is not completely eliminated, it is precisely reproduced upon playback. In both instances, recorded information can be reliably read out at far greater recording densities than was heretofore possible. Moreover, the skew inhibiting means which form the subject matter of the present invention can be incorporated into a tape transport without the necessity of modifying the existing tape path. As a consequence, independently determined optimum operating conditions may be maintained.

While the present invention has been explained with reference to a magnetic tape transport, it will be clear that it is not so limited and that it has applicability with reference to any web transport where skewing is to be inhibited. It will be further apparent that numerous modifications, departures, variations and equivalents will now occur to those skilled in the art, all of which fall within the scope contemplated by the present invention. Accordingly, the invention herein disclosed is to be construed as limited only by the spirit and scope of the appended claims.

What is claimed is:

1. In a transport for a flexible web, an operating station, a pair of capstans disposed on opposite sides of said station and selectively adapted to drive said web past the latter in mutually opposite directions, said capstans being narrower than said web, the path of said web including a pair of curved portions each determined by the perimeter of one of said capstans, web positioning means including a guide surface normal to the axis of said capstan and respectively adapted to contact one edge of said web in said curved path portion, at least one movably disposed pressure button corresponding to each of said curved path portions and having a pressure surface facing said guide surface, means for resiliently urging said pressure surface against the opposite edge of said web in said curved path portion, the edge portion contacted by said pressure surface being small with respect to said edge in said curved path portion, and a fixed button positioned opposite said pressure button and having a wear-resistant contact surface substantially flush with said guide surface.

2. In a transport for moving a flexible web past an operating station, a vacuum drive capstan positioned to one side of said station in the path of said web and being narrower than the latter, the perimeter of said capstan defining a curved portion of said web path, a fixed guide surface positioned to contact one edge of said web in said curved path portion, and at least one movable surface resiliently bearing against the opposite edge of said web in said curved path portion to urge said web against said fixed guide surface, said movable surface contacting said opposite web edge on a restricted edge segment of said curved path portion immediately preceding the region where the capstan vacuum pressure becomes fully effective on the arriving web.

3. In a transport for moving a flexible web past an operating station, a pair of capstans positioned on opposite sides of said station with their axes parallel to each other, each of said capstans defining a curved portion of the path of said web, the edges of said web overlapping each of said capstans, means for maintaining said web under tension at said capstans and said operating station, means for inhibiting web skewing at said operating station comprising a fixed guide surface adjacent one side of said capstans and normal to the axes thereof, a fixed support positioned on the other side said capstans, at least one pressure button movably disposed in said support alongside each of said curved path portions and including a pressure surface substantially parallel to said guide surface, and means for resiliently urging said pressure surface against one edge of said web in each curved path portion to cause the opposite web edge to bear against said guide surface, the edge portion contacted by said pressure surface being small with respect to said edge in said curved path portion.

4. The apparatus of claim 3 and further including a fixed button coaxial with each of said pressure buttons, each of said fixed buttons being set into said guide surface and having a wear-resistant contact surface substantially flush with the latter.

5. The apparatus of claim 3 wherein each of said pressure buttons is positioned in a bore disposed in said fixed support and having an axis normal to said guide surface, each bore including an internal shoulder which defines the limit of a section of enlarged diameter at one end of said bore remote from said capstan, said button being hollow and including a flange positioned in said enlarged bore section, a closure plate covering said one bore end, and a compression spring positioned in the hollow interior of said pressure button and bearing against said closure plate, said spring urging said button toward said web until said flange abuts said shoulder.

6. The apparatus of claim 3 wherein said web consists of magnetic tape, said operating station including transducer means for recording and reading out data from said tape, said capstans being selectively adapted to drive said tape in opposite directions past said transducer means, said fixed support carrying an additional pressure button paired with each of said first-recited pressure buttons and spaced therefrom, each of said additional buttons resiliently bearing against said one tape edge in said curved path portion.

7. The apparatus of claim 3 wherein said capstans normally rotate at constant speed in opposite directions, the surface of each capstan being grooved, means for applying vacuum pressure to a selected capstan to hold said web in contact with said grooved surface and thus impart the motion of the capstan thereto, said applied vacuum pressure being only partially effective in a region of the appropriate curved web path portion where initial engagement between said web and said grooved surface occurs, said pressure button contacting said one web edge in said region of said curved web path portion.

8. The apparatus of claim 7 wherein said support includes an additional pressure button paired with each of said first-recited pressure buttons and spaced therefrom, each of said additional pressure buttons contacting said one web edge in said region of the corresponding curved path portion.

9. In a magnetic tape transport, an operating station including magnetic transducer means for transferring data relative to said tape, a pair of counter-rotating vacuum capstans positioned on opposite sides of said station with their axes parallel to each other, each of said capstans being narrower in its axial dimension than the width of said tape and engaging the latter along a portion of the curved capstan perimeter, said capstans being adapted to drive said tape in mutually opposite directions by selectively applying vacuum pressure to one of them, said applied vacuum pressure being only partially effective in a region of said curved capstan perimeter portion wherein initial engagement between said tape and said capstan takes place, tape skew inhibiting means including a guide surface adjacent to one side of said capstans and normal to the axes thereof, said guide surface being adapted to contact one edge of said tape, a support structure disposed on the other side of said capstan, a pair of spaced pressure buttons held by said support structure alongside each of said regions, each of said buttons including a pressure surface facing said guide surface, and means for biasing each of said buttons in a direction to urge the pressure surface thereof forward of said support structure and into contact with the opposite edge of said tape in the corresponding one of said regions.

10. The apparatus of claim 9 wherein each of said buttons slidably engages a corresponding bore of said support structure, said bore including an internal shoulder defining the limit of a section of enlarged internal diameter at one end of said bore remote from said capstan, a closure plate covering said bore end, each of said buttons comprising a hollow cylindrical structure capped at one end by said pressure surface and terminating in an outwardly extending peripheral lip at its open end, a compression spring disposed in said hollow button and bearing against said closure plate, said spring urging said button forward until said lip abuts said shoulder.

11. The apparatus of claim 10 and further including a fixed button coaxial with each of said pressure buttons and set into said guide surface, each of said fixed buttons having a wear-resistant contact surface substantially flush with said guide surface.

References Cited

UNITED STATES PATENTS

| | | | |
|---|---|---|---|
| 2,726,859 | 12/1955 | Dolamore | 226—198 X |
| 2,742,283 | 4/1956 | Rivas | 226—198 |
| 3,122,295 | 2/1964 | Davidson et al. | 226—50 |

FOREIGN PATENTS

| | | |
|---|---|---|
| 616,348 | 7/1935 | Germany. |

ALLEN N. KNOWLES, *Primary Examiner.*